(12) United States Patent
Zhang et al.

(10) Patent No.: US 12,399,132 B2
(45) Date of Patent: Aug. 26, 2025

(54) MONITORING SYSTEM AND METHOD FOR BROKEN WIRES IN PCCP BASED ON DISTRIBUTED OPTICAL FIBER SENSING

(71) Applicant: Nanjing University, Jiangsu (CN)

(72) Inventors: Yixin Zhang, Jiangsu (CN); Shuai Tong, Jiangsu (CN); Xuping Zhang, Jiangsu (CN); Shaoxiong Tang, Jiangsu (CN); Ruofan Wang, Jiangsu (CN); Haoran Wang, Jiangsu (CN); Shun Wang, Jiangsu (CN); Feng Wang, Jiangsu (CN)

( * ) Notice: Subject to any disclaimer, the term of this patent is extended or adjusted under 35 U.S.C. 154(b) by 203 days.

(21) Appl. No.: 18/357,572

(22) Filed: Jul. 24, 2023

(65) Prior Publication Data

US 2024/0353349 A1    Oct. 24, 2024

(30) Foreign Application Priority Data

Apr. 19, 2023   (CN) .......................... 202310421581.5

(51) Int. Cl.
*G01N 21/95*  (2006.01)
*G01N 21/01*  (2006.01)

(52) U.S. Cl.
CPC ............. *G01N 21/95* (2013.01); *G01N 21/01* (2013.01)

(58) Field of Classification Search
CPC .......... G01M 11/3109; G01M 11/083; G01M 11/31; G01M 3/047; G01N 21/01; G01N 21/95; G08B 13/186
USPC ............................................. 356/237.1, 460
See application file for complete search history.

(56) References Cited

U.S. PATENT DOCUMENTS

| | | | | |
|---|---|---|---|---|
| 2007/0247631 A1* | 10/2007 | Paulson | ............... | G08B 13/186 356/477 |
| 2009/0285520 A1* | 11/2009 | Kaplan | ................ | G01M 11/083 385/12 |
| 2010/0290734 A1* | 11/2010 | Kaplan | ............... | G01M 5/0091 385/12 |
| 2012/0060615 A1* | 3/2012 | Farhadiroushan | ... | G01M 11/085 356/73.1 |
| 2012/0067126 A1* | 3/2012 | Hartog | .................... | F16L 55/48 73/584 |
| 2016/0252371 A1* | 9/2016 | Xiao | ................... | G01D 5/35387 356/478 |

FOREIGN PATENT DOCUMENTS

CN      113624322 A   * 11/2021

* cited by examiner

*Primary Examiner* — Sunghee Y Gray

(57) ABSTRACT

A monitoring system and method for broken wires in PCCP based on distributed optical fiber sensing relates to the technical field of optical fiber sensing. The monitoring system for broken wires in PCCP comprises a Sagnac interferometer, a Φ-OTDR system, a dual loopback system and a signal processing system. The Sagnac interferometer comprises a first laser, a first optical coupler, a first delay optical fiber, a Faraday rotating mirror and a first photodetector. The Φ-OTDR system comprises a second laser, a second optical coupler, an acousto-optic modulator, a circulator, a third optical coupler and a second photodetector. The dual loopback system comprises a wavelength division multiplexer and a second delay optical fiber. The invention solves the problems of low positioning accuracy, limited frequency measurement range, detection dead zone and high computing pressure in monitoring broken wires in PCCP.

10 Claims, 6 Drawing Sheets

MONITORING SYSTEM AND METHOD FOR BROKEN WIRES IN PCCP BASED ON DISTRIBUTED OPTICAL FIBER SENSING

1. TECHNICAL FIELD

The invention relates to the technical field of optical fiber sensing, in particular to a monitoring system and method for broken wires in PCCP based on distributed optical fiber sensing.

2. BACKGROUND ART

Pre-stressed Concrete Cylinder Pipe (PCCP) is a pipe commonly used to transport water and other fluids, consisting of a series of pre-stressed concrete cylinders. Broken wires in PCCP refer to the breakage of the pre-stressed reinforcement in the pipeline, causing a part of the pipeline to lose its pre-stress, which may cause problems such as cracking, deformation and destruction of the pipeline. Broken wires in PCCP usually have a serious impact on water conservancy establishment and the surrounding environment. Therefore, in order to ensure the safety and reliability of pipelines, the monitoring and maintenance of broken wires in PCCP is very important.

PCCP pipelines are usually composed of multiple pipe sections with a length of about 4 to 5 meters. When broken wires occur in PCCP, the signal frequency of the transient elastic wave is mainly concentrated in the high frequency band of 10 kHz to 20 kHz, and the duration is only tens of milliseconds. In order to realize the monitoring of PCCP broken wires, it is necessary to ensure that the spatial positioning uncertainty of the monitoring system is less than ±2.5 meters, and the frequency measurement range should be greater than 20 KHz. In addition, the monitoring system also needs to have transient signal capture and analysis capabilities to accurately identify and locate PCCP broken wire events.

Interferometer is a precision measuring instrument based on the principle of optical interference, which has the characteristics of high measurement accuracy, wide frequency measurement range, and good stability. Among them, the Sagnac interferometer is an interferometer that uses the Sagnac effect for measurement. Interferometers of this type typically have a frequency range in the MHz level and can achieve a rough positioning of vibration events. Therefore, they are widely used in gyroscopes, inertial navigation, seismology, etc. However, its positioning accuracy is low when performing long-distance monitoring, and there are problems such as inaccurate positioning of vibration events.

Phase-Sensitive Optical Time Domain Reflectometer (Φ-OTDR) is a high-resolution optical fiber sensor based on the principle of optical phase change, which is a kind of distributed optical fiber sensing. It uses a narrow linewidth laser to emit continuous light and then enters the sensing optical fiber for transmission after pulse modulation, and analyzes the Rayleigh backscattering light (RBS) signal generated by the sensing optical fiber through the photodetector, uses the principles of phase change and interference effect to monitor and locate weak events and changes in the fiber. It can realize the full-time monitoring of the sensing optical fiber, and has high application value and popularization prospect. Real-time monitoring of pipelines can be achieved by deploying optical fibers within PCCP pipes and utilizing Φ-OTDR technology, which is sensitive to the length, bending, and deformation of the optical fiber. This approach offers numerous advantages, including wide monitoring range, real-time performance, and high positioning accuracy, all of which contribute to significantly improving the safety and reliability of PCCP pipelines. However, since the frequency measurement range is limited by the sensing distance, it is difficult for Φ-OTDR technology to reach a frequency measurement range of 20 khz in long-distance monitoring scenarios, resulting in a weak ability of the system to capture transient signals. And the system is affected by coherent fading noise (fading), and there is a detection dead zone. In addition, it is very difficult to accurately identify the PCCP broken wire event and its location from the massive data obtained by the Φ-OTDR system.

In summary, the existing distributed optical fiber sensing technology has problems such as low positioning accuracy, limited frequency measurement range, detection dead zone, and high computing pressure in monitoring broken wires in PCCP.

3. SUMMARY OF THE INVENTION

Based on this, embodiments of the invention provide a monitoring system and method for broken wires in PCCP based on distributed optical fiber sensing, integrating Sagnac interferometry with Φ-OTDR technology to solve the problems of low positioning accuracy, limited frequency measurement range, detection dead zone and high computing pressure in monitoring broken wires in PCCP.

To realize the above objects, embodiments of the invention provide the following technical scheme:

A monitoring system for broken wires in PCCP based on distributed optical fiber sensing, it is used for detecting broken wires in PCCP pipelines. The PCCP pipeline comprises a pipeline body and an optical cable laid on the pipeline body. The optical cable at least comprises a first sensing optical fiber and a second sensing optical fiber.

The monitoring system for broken wires in PCCP comprises a Sagnac interferometer, a Φ-OTDR system, a dual loopback system and a signal processing system.

The Sagnac interferometer comprises a first laser, a first optical coupler, a first delay optical fiber, a Faraday rotating mirror and a first photodetector. The Φ-OTDR system comprises a second laser, a second optical coupler, an acousto-optic modulator, a circulator, a third optical coupler and a second photodetector. The dual loopback system comprises a wavelength division multiplexer and a second delay optical fiber.

The first laser is used to output the first laser light. The first port of the first optical coupler is used to receive the first laser light. The fourth port of the first optical coupler is used to transmit the first laser light to the first delay optical fiber. The first delay optical fiber is used to delay the first laser light to obtain the first delay light. The Faraday rotating mirror is used to rotate the polarization state of the first delay light to obtain a first state transition light, and return the first state transition light to the first delay optical fiber. The first delay optical fiber is also used to delay the first state transition light and return the obtained second delay light to the first optical coupler. The sixth port of the first optical coupler is used to transmit the first laser light to the wavelength division multiplexer.

The second laser is used to output a second laser light. The spectral width of the first laser light is greater than the spectral width of the second laser light. The correlation of the first laser light is smaller than the correlation of the second laser light. The second optical coupler is used to divide the second laser light into two paths. One path is the probe light and the other path is the reference light. The acousto-optic modulator is used to modulate the probe light into pulsed light with a set frequency shift amount. The first port of the circulator is used to receive the pulsed light. The second port of the circulator is used to transmit the pulsed light to the wavelength division multiplexer.

One end of the wavelength division multiplexer is connected to one end of the first sensing optical fiber. The other end of the first sensing optical fiber is connected to one end of the second delay optical fiber. The other end of the second delay optical fiber is connected to one end of the second sensing optical fiber. The other end of the second sensing optical fiber is connected to the fifth port of the first optical coupler. The wavelength division multiplexer is used to transmit the first laser light to the first sensing optical fiber. The first laser light is sequentially transmitted through the first sensing optical fiber, the second delay optical fiber and the second sensing optical fiber to generate a third delay light. The fifth port of the first optical coupler is used to receive the third delay light. The wavelength division multiplexer is also used to transmit the pulsed light to the first sensing optical fiber. The pulsed light sequentially passes through the first sensing optical fiber, the second delay optical fiber and the second sensing optical fiber and generates Rayleigh backscattering light during transmission. After the Rayleigh backscattering light passes through the wavelength division multiplexer and the second port of the circulator in sequence, it enters the third optical coupler from the third port of the circulator.

The fifth port of the first optical coupler is also used to transmit the second delay light to the second sensing optical fiber. After the second delay light is sequentially transmitted through the second sensing optical fiber, the second delay optical fiber and the first sensing optical fiber, the first interference optical signal is generated. The sixth port of the first optical coupler is also used to receive the first interference optical signal.

The fourth port of the first optical coupler is also used to transmit the third delay light to the first delay optical fiber. The first delay optical fiber is also used to delay the third delay light to obtain the fourth delay light. The Faraday rotating mirror is used to rotate the polarization state of the fourth delay light to obtain a second state transition light, and return the second state transition light to the first delay optical fiber. The first delay optical fiber is also used to delay the second state transition light to obtain a second interference optical signal. The fourth port of the first optical coupler is also used to receive the second interference optical signal. The first interference optical signal and the second interference optical signal interfere with each other at the third port of the first optical coupler to form the interference signal.

The first photodetector is connected to the third port of the first optical coupler for receiving the interference signal, and performing photoelectric conversion on the interference signal to obtain a first electrical signal.

The third optical coupler is used to couple the pulsed light and the Rayleigh backscattering light to form the intermediate frequency signal. The second photodetector is connected to the third optical coupler for receiving the intermediate frequency signal, and performing photoelectric conversion on the intermediate frequency signal to obtain a second electrical signal.

The signal processing system is respectively connected to the first photodetector and the second photodetector.

The signal processing system is used for:

Performing phase demodulation on the first electrical signal to obtain a first time-domain signal.

Performing energy spectrum analysis and spectral analysis on the first time-domain signal to determine whether a suspected broken wire event occurs in the PCCP pipeline. And performing delay positioning calculations according to the first time-domain signal to determine the initial location of a suspected broken wire event when a suspected broken wire event occurs.

Performing amplitude and phase demodulation on the second electrical signal to obtain a second time-domain signal.

Performing energy spectrum analysis and spectral analysis on the second time-domain signal to complete the screening of the preliminary position of the suspected broken wire event, and determine the final position of the suspected broken wire event and whether the suspected broken wire event is a real broken wire event.

Optionally, the Sagnac interferometer also comprises a first optical filter and a second optical filter.

The first optical filter is arranged between the sixth port of the first optical coupler and the wavelength division multiplexer. The second optical filter is arranged between the second sensing optical fiber and the fifth port of the first optical coupler.

Optionally, the Φ-OTDR system comprises an erbium doped fiber amplifier.

The erbium doped fiber amplifier is arranged between the acousto-optic modulator and the circulator.

Optionally, the Sagnac interferometer also comprises an optical isolator.

The optical isolator is arranged between the first laser and the first port of the first optical coupler.

Optionally, the signal processing system specifically comprises a data acquisition card and a computer.

The data acquisition card is respectively connected with the first photodetector, the second photodetector and the computer.

The data acquisition card is used to collect the first electrical signal and the second electrical signal.

The computer comprises:

A first demodulation module is used to perform phase demodulation on the first electrical signal to obtain a first time-domain signal.

The preliminary analysis module of the broken wire location is used to perform energy spectrum analysis and spectral analysis on the first time-domain signal to determine whether a suspected broken wire event occurs in the PCCP pipeline, and perform delay positioning calculations according to the first time-domain signal to determine the initial location of a suspected broken wire event when a suspected broken wire event occurs.

A second demodulation module is used to perform amplitude and phase demodulation on the second electrical signal to obtain a second time-domain signal.

The final analysis module of the broken wire location is used to perform energy spectrum analysis and spectral analysis on the second time-domain signal to complete the screening of the preliminary position of the suspected broken wire event, and determine the final position of the suspected broken wire event and whether the suspected broken wire event is a real broken wire event.

Optionally, the signal processing system also comprises an acousto-optic modulation driver.

The acousto-optic modulation driver is respectively connected with the data acquisition card and the acousto-optic modulator. The data acquisition card is also used to receive the clock carrier signal and the pulse trigger modulation signal sent by the computer. The acousto-optic modulation driver is used to output a high-level pulse modulation signal to the acousto-optic modulator according to the clock carrier signal and the pulse trigger modulation signal.

Optionally, the signal processing system also comprises an electrical filter.

The electrical filter is arranged between the second photodetector and the data acquisition card.

To realize the above objects, the invention also provides the following scheme:

A monitoring method for broken wires in PCCP based on distributed optical fiber sensing, it is used for the above monitoring system for broken wires in PCCP. The method comprises:

Acquiring the first electrical signal and the second electrical signal. The first electrical signal is obtained by photoelectrically converting the interference signal. The second electrical signal is obtained by photoelectrically converting the intermediate frequency signal. The interference signal is formed by the mutual interference of the first interference optical signal and the second interference optical signal. The first interference optical signal is formed by the first laser light passing through the fourth port of the first optical coupler, the first delay optical fiber, the Faraday rotating mirror, the first delay optical fiber, the fourth port of the first optical coupler, the fifth port of the first optical coupler, the second sensing optical fiber, the second delay optical fiber, the first sensing optical fiber, the wavelength division multiplexer and the sixth port of the first optical coupler. The first interference optical signal is formed by the first laser light passing through the sixth port of the first optical coupler, the wavelength division multiplexer, the first sensing optical fiber, the second delay optical fiber, the second sensing optical fiber, the fifth port of the first optical coupler, the fourth port of the first optical coupler, the first delay optical fiber, the Faraday rotating mirror, the first delay optical fiber and the fourth port of the first optical coupler. The intermediate frequency signal is obtained by coupling pulsed light and Rayleigh backscattering light in the second laser light. The Rayleigh backscattering light is the backward generated in the transmission process when the probe light in the second laser light successively passes through the acousto-optic modulator, the circulator, the wavelength division multiplexer, the first sensing optical fiber, the second delay optical fiber and the second sensing optical fiber.

Performing phase demodulation on the first electrical signal to obtain a first time-domain signal.

Performing energy spectrum analysis and spectral analysis on the first time-domain signal to determine whether a suspected broken wire event occurs in the PCCP pipeline. And performing delay positioning calculations according to the first time-domain signal to determine the initial location of a suspected broken wire event when a suspected broken wire event occurs.

Performing amplitude and phase demodulation on the second electrical signal to obtain a second time-domain signal.

Performing energy spectrum analysis and spectral analysis on the second time-domain signal to complete the screening of the preliminary position of the suspected broken wire event, and determine the final position of the suspected broken wire event and whether the suspected broken wire event is a real broken wire event.

Optionally, performing energy spectrum analysis and spectral analysis on the first time-domain signal to determine whether a suspected broken wire event occurs in the PCCP pipeline, which specifically comprises:

Performing energy spectrum analysis on the first time-domain signal to determine the short-term energy spectrum of the first time-domain signal.

Comparing the short-term energy spectrum of the first time-domain signal with the pre-stored short-term energy spectrum of the system background noise, the first time-domain signal whose difference between the short-term energy spectrum of the first time-domain signal and the short-term energy spectrum of the system background noise exceeds the set energy spectrum difference range is determined as an abnormal signal.

Performing spectral analysis on the abnormal signal to obtain the spectral features of the abnormal signal.

Comparing the spectral features of the abnormal signal with the spectral features in the pre-stored PCCP broken wire database. If the spectral features of the abnormal signal are consistent with the spectral features in the PCCP broken wire database, then it is determined that a suspected broken wire event has occurred in the PCCP pipeline.

Optionally, performing energy spectrum analysis and spectral analysis on the second time-domain signal to complete the screening of the preliminary position of the suspected broken wire event, and determine the final position of the suspected broken wire event and whether the suspected broken wire event is a real broken wire event, which specifically comprises:

Performing coherent fading noise suppression on the second time-domain signal by using the fading noise suppression method to obtain a suppressed time-domain signal.

Performing energy spectrum analysis on the suppressed time-domain signal to determine the final location of the suspected broken wire event.

Performing spectral analysis on the time-domain signal at the final position of the suspected broken wire event. If the spectral features of the time-domain signal at the final position of the suspected broken wire event are consistent with the spectral features of the first time-domain signal, then it is determined that the suspected broken wire event is a real broken wire event.

According to the specific embodiments provided by the invention, the invention provides the following technical effects:

The embodiments of the invention integrates Sagnac interferometer and Φ-OTDR system, and multiplex the optical signals of Sagnac interferometer and Φ-OTDR system into the same optical fiber through the wavelength division multiplexer, which can improve transmission capacity and reduce insertion loss. The structure of Faraday rotating mirror can eliminate circular birefringence and linear birefringence. By adjusting the length of the delay optical fiber, interference signals can be avoided from canceling each other, thereby ensuring that the monitoring system for broken wires in PCCP will not fail to detect and locate PCCP broken wire events. The dual loopback system significantly improves the detectability of the system. The signal processing system conducts qualitative analysis on PCCP broken wire events through Sagnac interference technology and gives the preliminary position of suspected broken wire events, and then uses Φ-OTDR technology to perform precise positioning, so that the system can identify PCCP broken wires events through qualitative analysis and precise positioning. Therefore, embodiments of the invention solve the problems of low positioning accuracy, limited frequency measurement range, detection dead zone and high computing pressure in monitoring broken wires in PCCP.

4. BRIEF DESCRIPTION OF ACCOMPANY DRAWINGS

In order to more clearly illustrate the technical schemes in the embodiments of the invention or the prior art, the following will briefly introduce the accompanying drawings required in the embodiments. Obviously, the accompanying drawings in the following description are only some embodiments of the invention. For those of ordinary skill in the art, they can also obtain the other accompanying drawings according to these accompanying drawings without making creative efforts.

5. SPECIFIC EMBODIMENT OF THE INVENTION

The following will clearly and completely describe the technical schemes in the embodiments of the invention in combination with the accompanying drawings in the embodiments of the invention. Obviously, the described embodiments are only some, not all embodiments of the invention. Based on the embodiments of the invention, all other embodiments obtained by those of ordinary skill in the art without making creative efforts belong to the protection scope of the invention.

In order to make the above objects, features and advantages of the invention more comprehensible, the invention will be further described in detail below in combination with the accompanying drawings and specific embodiments.

PCCP pipeline is a common underground conveying water pipeline. Since the pipeline will be affected by various stresses and environmental factors during transportation, installation and use, the pre-stressed reinforcements are prone to fracture or corrosion, which will lead to a decline in the performance of the pipeline, and even cause serious accidents such as pipe bursts. Therefore, it is very important to monitor PCCP pipelines for broken wires. The following embodiments provide a monitoring system and method for broken wires in PCCP based on distributed optical fiber sensing, which is realized by integrating Sagnac interference and Φ-OTDR technology.

Embodiment 1

This embodiment provides a monitoring system for broken wires in PCCP based on distributed optical fiber sensing, it is used for detecting broken wires in PCCP pipelines. The PCCP pipeline comprises a pipeline body and an optical cable laid on the pipeline body. The optical cable at least comprises a first sensing optical fiber and a second sensing optical fiber.

Figure 1:
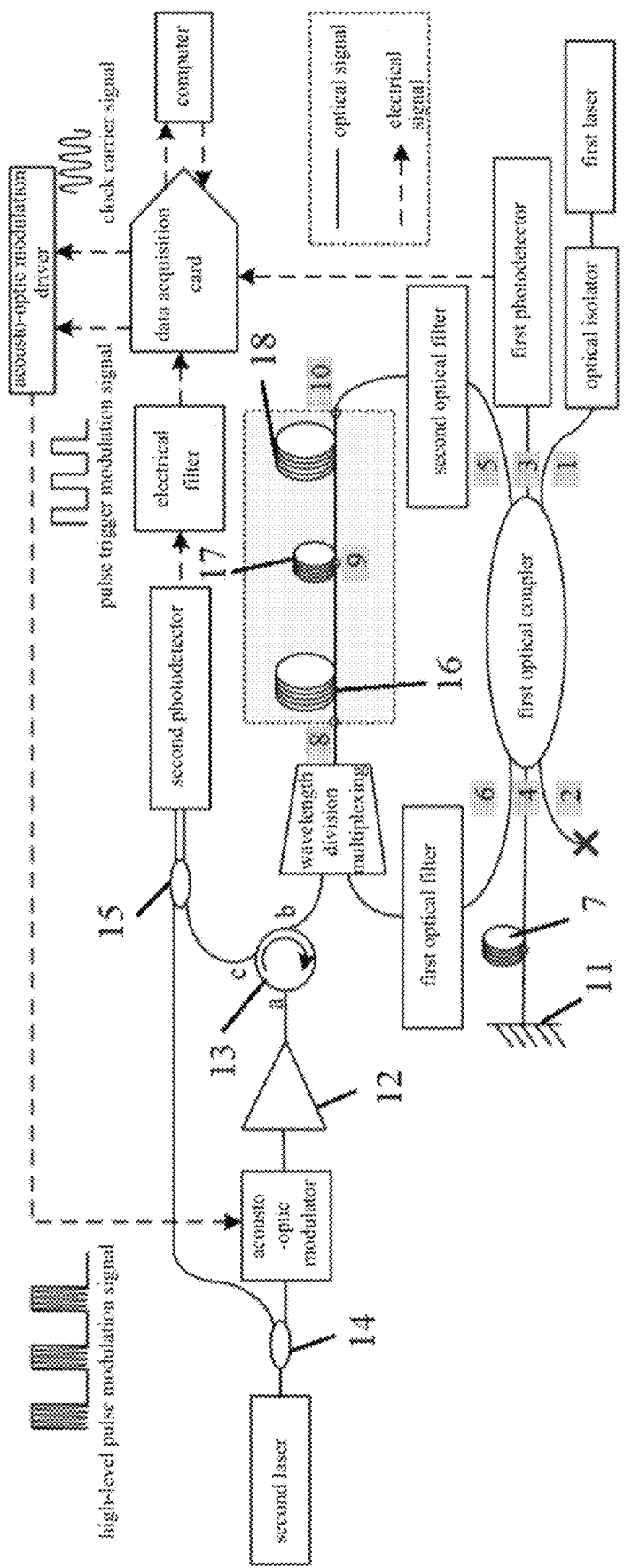
FIG. 1 is a schematic diagram of a monitoring system for broken wires in PCCP based on distributed optical fiber sensing provided by embodiments of the invention.

Referring to FIG. 1, the monitoring system for broken wires in PCCP comprises a Sagnac interferometer, a Φ-OTDR system, a dual loopback system and a signal processing system.

Figure 2:
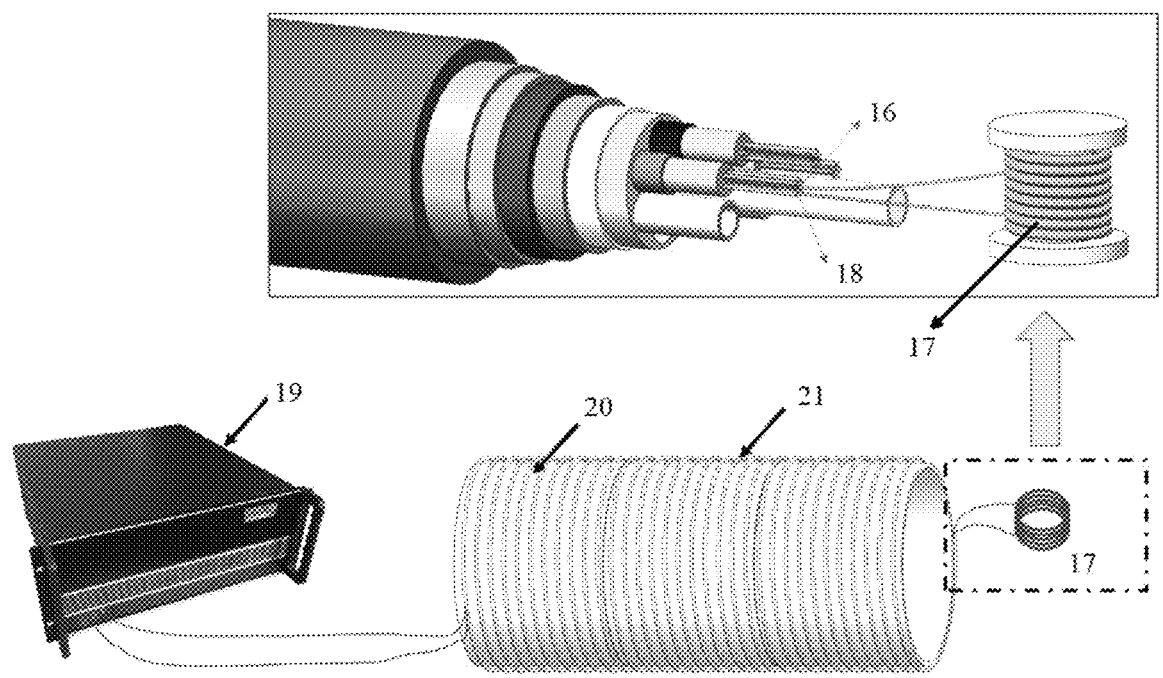
FIG. 2 is a schematic diagram of the positional relationship between the PCCP pipeline and the monitoring system for broken wires in PCCP provided by the embodiments of the invention.

The Sagnac interferometer comprises a first laser, a first optical coupler, a first delay optical fiber 7, a Faraday rotating mirror 11 (FRM) and a first photodetector. The Φ-OTDR system comprises a second laser, a second optical coupler 14, an acousto-optic modulator (AOM), a circulator 13, a third optical coupler 15 and a second photodetector. The dual loopback system comprises a Wavelength Division Multiplexer (WDM) and a second delay optical fiber 17. The first sensing optical fiber 16, the second delay optical fiber 17 and the second sensing optical fiber 18 together form an integral sensing optical fiber. The positional relationship between the PCCP pipeline and the monitoring system for broken wires in PCCP is as shown in FIG. 2. Wherein, 19 denotes the monitoring system for broken wires in PCCP; 20 denotes the pipeline body; and 21 denotes the optical cable.

The first laser is used to output the first laser light. The first laser light is wide-spectrum low-coherence continuous light. The first optical coupler is used to receive, couple, and transmit optical signals. Wherein, the second port 2 is responsible for input and output work. The first port 1 of the first optical coupler is used to receive the first laser light. The fourth port 4 of the first optical coupler is used to transmit the first laser light to the first delay optical fiber 7. The first delay optical fiber 7 transmits the optical signal between the fourth port 4 of the first optical coupler and the Faraday rotating mirror 11. It takes time for the optical signal to pass through this position. Therefore, a certain time delay will be generated. The first delay optical fiber 7 is used to delay the first laser light to obtain the first delay light. The Faraday rotating mirror 11 is used to rotate the polarization state of the optical signal input by the first delay optical fiber 7 and then output it to the first delay optical fiber 7, that is, the Faraday rotating mirror 11 is used to rotate the polarization state of the first delay light to obtain a first state transition light, and return the first state transition light to the first delay optical fiber 7. The first delay optical fiber 7 is also used to delay the first state transition light and return the obtained second delay light to the first optical coupler. The sixth port 6 of the first optical coupler is used to transmit the first laser light to the wavelength division multiplexer.

The second laser is used to output a second laser light. The second laser light is a continuous narrow-linewidth high-coherence light. The spectral width of the first laser light is greater than the spectral width of the second laser light. The correlation of the first laser light is smaller than the correlation of the second laser light. The second optical coupler 14 is used to divide the second laser light into two paths. One path is the probe light and the other path is the reference light. The probe light signal is output to the acousto-optic modulator. The reference light is output to the third optical coupler 15. The acousto-optic modulator is used to modulate the probe light into pulsed light with a set frequency shift amount. The first port a of the circulator 13 is used to receive the pulsed light. The second port b of the circulator 13 is used to transmit the pulsed light to the wavelength division multiplexer.

One end of the wavelength division multiplexer is connected to one end of the first sensing optical fiber 16. The other end of the first sensing optical fiber 16 is connected to one end of the second delay optical fiber 17. The other end of the second delay optical fiber 17 is connected to one end of the second sensing optical fiber 18. The other end of the second sensing optical fiber 18 is connected to the fifth port 5 of the first optical coupler. The connection end of the wavelength division multiplexer and the first sensing optical fiber 16 is a port 8. The connection end of the first sensing optical fiber 16, the second delay optical fiber 17 and the first sensing optical fiber 16 is a port 9. The connection end of the second delay optical fiber 17 and the first optical coupler is a port 10. The first laser and the second laser use different central wavelengths and occupy different bandwidths respectively. Therefore, the optical signals of different wavelengths input by the first optical coupler and the second port b of the circulator 13 can be multiplexed into the sensing fiber by using the wavelength division multiplexer. At the same time, the wavelength division multiplexer can separate the input optical signals of different wavelengths to realize bidirectional transmission of signals. Wherein, for the interferometer, the wavelength division multiplexer is mainly used for the optical signal transmission between the first optical coupler and the sensing optical fiber. The interferometer is mainly used for transmitting the optical signals input by port 8 and port 10. For the Φ-OTDR system, the wavelength division multiplexer is mainly used to transmit the pulsed light input from the second port b of the circulator 13 to the sensing optical fiber, and output the returned Rayleigh backscattering light (RBS) signal to the second port b of the circulator 13.

In particular, the wavelength division multiplexer is used to transmit the first laser light to the first sensing optical fiber 16. The first laser light is sequentially transmitted through the first sensing optical fiber 16, the second delay optical fiber 17 and the second sensing optical fiber 18 to generate a third delay light. The fifth port 5 of the first optical coupler is used to receive the third delay light. The wavelength division multiplexer is also used to transmit the pulsed light to the first sensing optical fiber 16. The pulsed light sequentially passes through the first sensing optical fiber 16, the second delay optical fiber 17 and the second sensing optical fiber 18 and generates Rayleigh backscattering light during transmission. After the Rayleigh backscattering light passes through the wavelength division multiplexer and the second port b of the circulator 13 in sequence, it enters the third optical coupler 15 from the third port c of the circulator 13.

The fifth port 5 of the first optical coupler is also used to transmit the second delay light to the second sensing optical fiber 18. After the second delay light is sequentially transmitted through the second sensing optical fiber 18, the second delay optical fiber 17 and the first sensing optical fiber 16, the first interference optical signal is generated. The sixth port 6 of the first optical coupler is also used to receive the first interference optical signal.

The fourth port 4 of the first optical coupler is also used to transmit the third delay light to the first delay optical fiber 7. The first delay optical fiber 7 is also used to delay the third delay light to obtain fourth delay light. The Faraday rotating mirror 11 is used to rotate the polarization state of the fourth delay light to obtain a second state transition light, and return the second state transition light to the first delay optical fiber 7. The first delay optical fiber 7 is also used to delay the second state transition light to obtain a second interference optical signal. The fourth port 4 of the first optical coupler is also used to receive the second interference optical signal. The first interference optical signal and the second interference optical signal interfere with each other at the third port 3 of the first optical coupler to form the interference signal. The Sagnac interferometer consists of two interferometric paths. The path of the first interference optical signal: first port 1-fourth port 4-first delay optical fiber 7-FRM-first delay optical fiber 7-fourth port 4-fifth port 5-port 10-port 9-port 8-sixth port 6-third port 3. The path of the second interference optical signal: first port 1-sixth port 6-port 8-port 9-port 10-fifth port 5-fourth port 4-first delay optical fiber 7-FRM-first delay optical fiber 7-fourth port 4-third port 3. The two paths pass through the same fiber in different orders and enter the first photodetector with the same optical path, causing interference. As a result of utilizing the wide-spectrum low-coherence light source, there is no interference between the light signals entering the first photodetector through other paths.

The first photodetector is connected to the third port 3 of the first optical coupler for receiving the interference signal, and performing photoelectric conversion on the interference signal to obtain a first electrical signal.

The third optical coupler 15 is used to couple the pulsed light and the Rayleigh backscattering light to form the intermediate frequency signal. The second photodetector is connected to the third optical coupler 15 for receiving the intermediate frequency signal, and performing photoelectric conversion on the intermediate frequency signal to obtain a second electrical signal.

The signal processing system is respectively connected to the first photodetector and the second photodetector. The signal processing system is used for the following aspects: performing phase demodulation on the first electrical signal to obtain a first time-domain signal; performing energy spectrum analysis and spectral analysis on the first time-domain signal to determine whether a suspected broken wire event occurs in the PCCP pipeline; performing delay positioning calculations according to the first time-domain signal to determine the initial location of a suspected broken wire event when a suspected broken wire event occurs; performing amplitude and phase demodulation on the second electrical signal to obtain a second time-domain signal; performing energy spectrum analysis and spectral analysis on the second time-domain signal to complete the screening of the preliminary position of the suspected broken wire event, and determine the final position of the suspected broken wire event and whether the suspected broken wire event is a real broken wire event.

As an optional embodiment, the Sagnac interferometer also comprises a first optical filter and a second optical filter. The first optical filter is arranged between the sixth port 6 of the first optical coupler and the wavelength division multiplexer. The second optical filter is arranged between the second sensing optical fiber 18 and the fifth port 5 of the first optical coupler.

The first optical filter is used to transmit the optical signal between the first optical coupler and the wavelength division multiplexer, and perform optical band-pass filtering to filter the optical signal input by the second laser and prevent the optical signal input by the second laser from being output to the first optical coupler through the sixth port by the wavelength division multiplexer.

The second optical filter is used to transmit the optical signal between the first optical coupler and the sensing optical fiber, and perform optical band-pass filtering to filter the optical signal input by the second laser and prevent the optical signal input by the second laser from being input to the first optical coupler through the fifth port by the sensing optical fiber.

As an optional embodiment, the Φ-OTDR system comprises an erbium doped fiber amplifier 12 (EDFA). The erbium doped fiber amplifier 12 is arranged between the acousto-optic modulator and the circulator 13. The erbium doped fiber amplifier 12 is used to amplify the pulsed light input by the acousto-optic modulator and output it to the first port a of the circulator 13.

As an optional embodiment, the Sagnac interferometer also comprises an optical isolator. The optical isolator is arranged between the first laser and the first port 1 of the first optical coupler. The optical isolator is used to transmit continuous light to the first port 1 of the first optical coupler. At the same time, it has the characteristic of unidirectional transmission, which can prevent the backward transmitted light due to various reasons from adversely affecting the stability of the output power of the second laser.

As an optional embodiment, the signal processing system specifically comprises a data acquisition card (DAC) and a computer (PC).

The data acquisition card is respectively connected with the first photodetector, the second photodetector and the computer. The data acquisition card is used to collect the first electrical signal and the second electrical signal.

The computer comprises:

A first demodulation module is used to perform phase demodulation on the first electrical signal to obtain a first time-domain signal.

The preliminary analysis module of the broken wire location is used to perform energy spectrum analysis and spectral analysis on the first time-domain signal to determine whether a suspected broken wire event occurs in the PCCP pipeline, and perform delay positioning calculations according to the first time-domain signal to determine the initial location of a suspected broken wire event when a suspected broken wire event occurs.

A second demodulation module is used to performing amplitude and phase demodulation on the second electrical signal to obtain a second time-domain signal.

The final analysis module of the broken wire location is used to perform energy spectrum analysis and spectral analysis on the second time-domain signal to complete the screening of the preliminary position of the suspected broken wire event, and determine the final position of the suspected broken wire event and whether the suspected broken wire event is a real broken wire event.

As an optional embodiment, the signal processing system also comprises an acousto-optic modulation driver (AOM Driver). The acousto-optic modulation driver is respectively connected with the data acquisition card and the acousto-optic modulator. The data acquisition card is also used to receive the clock carrier signal and the pulse trigger modulation signal sent by the computer. The acousto-optic modulation driver is used to output a high-level pulse modulation signal to the acousto-optic modulator according to the clock carrier signal and the pulse trigger modulation signal. The computer is also used to control the working state of the data acquisition card. The acousto-optic modulator, modulated by the acousto-optic modulation driver, modulates the continuous probe light input by the second optical coupler 14 into pulsed light, and generates a fixed frequency shift amount, and outputs it to the erbium doped fiber amplifier 12.

As an optional embodiment, the signal processing system also comprises an electrical filter. The electrical filter is arranged between the second photodetector and the data acquisition card. The electrical filter is used to perform a specific bandwidth filtering on the second electrical signal input by the second photodetector and output it to the data acquisition card for acquisition.

In practical applications, a specific implementation process of the monitoring system for broken wires in PCCP based on distributed optical fiber sensing of this embodiment is as follows:

1) The first laser outputs wide-spectrum low-coherence continuous light (1530 nm, line width 10 nm) and enters the first optical coupler after passing through the optical isolator. The coupler can use a 3*3 optical coupler (with a splitting ratio is 1:1:1). The optical signal is evenly divided into three parts and then output from the second port 2, the fourth port 4, and the sixth port 6. Wherein, the light of the second port 2 is lost.

2) The optical signal output by the sixth port 6 passes through the first optical filter (1530 nm, bandwidth 10 nm), the wavelength division multiplexer, the first sensing optical fiber 16, the second delay optical fiber 17, the second sensing optical fiber 18, the second optical filter (1530 nm, bandwidth 10 nm) in sequence, and then inputs the first optical coupler through the fifth port 5. Part of the light is output through the fourth port 4, and then passes through the first delay optical fiber 7, the Faraday rotating mirror 11, and the first delay optical fiber 7 to enter the first optical coupler. This signal is called the first interference optical signal.

3) The optical signal output from the fourth port 4 passes through the first delay optical fiber 7 and then is adjusted by the Faraday rotating mirror 11 for the polarization state, and then enters the first coupler through the first delay optical fiber 7. After being equally divided into three parts, part of the light enters the second optical filter through the fifth port 5, and then passes through the second sensing optical fiber 18, the second delay optical fiber 17, the first sensing optical fiber 16, the wavelength division multiplexer, and the first optical filter, and returns to the first optical coupler through the sixth port 6. This signal is called the second interference optical signal.

4) When the first and second interference optical signals meet at the third port 3 of the first optical coupler, because they pass through the same optical path, the interference signal is formed. The interference signal is finally received by the first photodetector, converted into an electrical signal, and then analyzed and processed by the computer after undergoing analog-to-digital conversion by the data acquisition card. The first photodetector adopts the photodetector with an operating wavelength of 1550.12 nm, a detection bandwidth of 200 Mhz, and a gain of 45 dB.

5) While the first laser is working, the second laser is also continuously outputting narrow-linewidth laser light to the second optical coupler 14. The wavelength of the second laser is 1550 nm, the line width is 100 hz, and the output power is 9.82 dBm. The second optical coupler 14 adopts a 1*2 optical coupler (with a splitting ratio of 90:10), in which 90% of the light is output to the acousto-optic modulator as the probe light signal, and 10% of the light is output to the third optical modulator 15 as the reference light.

6) The data acquisition card outputs a 10 Mhz clock signal and a pulse modulation signal to the acousto-optic modulation driver. The acousto-optic modulator frequency doubles the frequency of the 10 Mhz clock signal to 200 Mhz, then chops through the pulse modulation signal to output a high-level pulse modulation signal to the acousto-optic modulator.

7) The probe light is modulated into pulsed light after passing through the acousto-optic modulator, while generating a frequency shift of 200 MHz. Its peak-to-peak value is amplified to −10.38 dBm by the erbium doped fiber amplifier 12. It is finally input to the first port a of the circulator 13, and output to the wavelength division multiplexer by the second port b of the circulator 13.

8) The working wavelength of the wavelength division multiplexer is the C-band of 1530 nm-1565 nm, the insertion loss is 0.25 dB, and the isolation is 50 dB. It transmits the pulsed light input from the second port b of the circulator 13 to the sensing optical fiber, and outputs the returned Rayleigh backscattering light (RBS) signal to the second port b of the circulator 13 to prevent the light of the first laser light source from entering the circulator 13.

9) Due to the good coherence of the light source, the Rayleigh backscattering light (RBS) output from the third port c of the circulator 13 and the reference light beat inside the third optical coupler 15 to finally form an intermediate frequency signal. The third optical coupler 15 adopts a 2*2 optical coupler (with a splitting ratio of 50:50).

10) The intermediate frequency signal is detected by the second photodetector. The detector uses a balanced photodetector (BPD) with dual input ports. Its working wavelength is 800~1700 nm and its detection bandwidth is 250 Mhz. This detector adopts a balanced photodetector, which can suppress common-mode noise (rejection ratio reaches 25 dB) and reduce the system noise floor. The electrical signal output by the second photodetector is band-pass filtered by the electrical filter, and then output to the data acquisition card for analog-to-digital conversion, and finally analyzed and processed by the computer.

The above-mentioned monitoring system for broken wires in PCCP based on distributed optical fiber sensing, the whole monitoring process includes the calibration part and the monitoring part, as follows:

Calibration:

1) Connecting the two single-mode sensing optical fibers on the PCCP to the system. The terminals of two single-mode optical fibers are connected through a second delay optical fiber to ensure that the midpoint of the interference path falls on the second delay optical fiber 17. 2) Performing phase demodulation on the intermediate frequency signal collected by the data acquisition card, and calibrating the spatial position of the sensing optical fiber. 3) Obtaining the starting and ending positions of the first sensing optical fiber 16 and the second sensing optical fiber 18, and obtaining the total length of the sensing optical fiber. 4) In the case of no PCCP broken wires, performing phase demodulation on the interference signal collected by the data acquisition card to obtain its short-term energy spectrum estimation, and completing the system's statistics on the background noise of the interference signal. After the system calibration is completed, the monitoring of PCCP broken wire events can be started.

Monitoring:

1) After completing position calibration and system noise statistics, the system realizes continuous monitoring of PCCP broken wire events through interference signal collection and phase demodulation analysis. The system only performs short-term data caching for intermediate frequency signals without analysis and processing.

2) Obtaining the time-domain signal by performing phase demodulation on the interference signal, and comparing its short-term energy spectrum with the short-term energy spectrum of the system background noise, identifying the energy abnormal moment, and calibrating it as an abnormal signal.

3) Performing short-term spectrum analysis on the identified abnormal signal, and comparing it with the spectrum features in the PCCP broken wire database. If the spectrum features are consistent, it proves that a PCCP broken wire event occurred at that moment.

4) Obtaining the PCCP broken wire event for delay positioning calculation, and calculating the location of the suspected broken wire event.

5) Obtaining the dual loopback signal captured by the coherent detection type Φ-OTDR system corresponding to the position of the suspected broken wire event at this moment, and performing amplitude and phase demodulation.

6) The coherent fading noise (fading) is suppressed by the dual loopback fading noise suppression method. After the coherent fading noise suppression is completed, performing the short-term energy spectrum analysis on the demodulated time-domain signal to obtain the precise location of the suspected broken wire event.

7) Performing short-term spectrum analysis on the time-domain signal at the precise location of the suspected broken wire event, and comparing it with the short-term spectrum features of the interferometer. If the common spectrum features are consistent, it is determined that the PCCP broken wire event occurred at this location.

8) Recording and alarming the time, precise location and signal features of the broken wire event.

The monitoring system for broken wires in PCCP based on distributed optical fiber sensing of this embodiment comprises the Sagnac interferometer with broad-spectrum low-coherence light source and the coherent detection type Φ-OTDR system with narrow-linewidth high-coherence light source. Their optical signals are multiplexed into the same optical fiber through the wavelength division multiplexer to increase transmission capacity and reduce insertion loss. The Faraday rotating mirror 11 in the system can eliminate circular birefringence and linear birefringence. By adjusting the length of the delay optical fiber, interference signals can be avoided from canceling each other, thereby ensuring that the system will not fail to detect and locate PCCP broken wire events. The sensing optical fiber adopting the dual loopback system significantly improves the detectability of the system. Conducting qualitative analysis on PCCP broken wire events through Sagnac interference technology and giving the position of suspected broken wire events, and then using Φ-OTDR technology to perform precise positioning, so that the system can identify PCCP broken wires events through qualitative analysis and precise positioning.

Embodiment 2

In order to realize the system corresponding to the above Embodiment 1 and obtain corresponding functions and technical effects, a monitoring method for broken wires in PCCP based on distributed optical fiber sensing is provided below.

The method is used in the system of the above Embodiment 1, and the method includes:

Step 101: Acquiring the first electrical signal and the second electrical signal. The first electrical signal is obtained by photoelectrically converting the interference signal. The second electrical signal is obtained by photoelectrically converting the intermediate frequency signal. The interference signal is formed by the mutual interference of the first interference optical signal and the second interference optical signal. The first interference optical signal is formed by the first laser light passing through the fourth port of the first optical coupler, the first delay optical fiber 7, the Faraday rotating mirror 11, the first delay optical fiber 7, the fourth port of the first optical coupler, the fifth port of the first optical coupler, the second sensing optical fiber 18, the second delay optical fiber 17, the first sensing optical fiber 16, the wavelength division multiplexer and the sixth port of the first optical coupler. The first interference optical signal is formed by the first laser light passing through the sixth port of the first optical coupler, the wavelength division multiplexer, the first sensing optical fiber 16, the second delay optical fiber 17, the second sensing optical fiber 18, the fifth port of the first optical coupler, the fourth port of the first optical coupler, the first delay optical fiber 7, the Faraday rotating mirror 11, the first delay optical fiber 7 and the fourth port of the first optical coupler. The intermediate frequency signal is obtained by coupling pulsed light and Rayleigh backscattering light in the second laser light. The Rayleigh backscattering light is the backward generated in the transmission process when the probe light in the second laser light successively passes through the acousto-optic modulator, the circulator 13, the wavelength division multiplexer, the first sensing optical fiber 16, the second delay optical fiber 17 and the second sensing optical fiber 18.

Step 102: Performing phase demodulation on the first electrical signal to obtain a first time-domain signal.

Step 103: Performing energy spectrum analysis and spectral analysis on the first time-domain signal to determine whether a suspected broken wire event occurs in the PCCP pipeline. And performing delay positioning calculations according to the first time-domain signal to determine the initial location of a suspected broken wire event when a suspected broken wire event occurs.

Wherein, the process of determining whether a suspected broken wire event occurs in the PCCP pipeline is as follow:

Performing energy spectrum analysis on the first time-domain signal to determine the short-term energy spectrum of the first time-domain signal.

Comparing the short-term energy spectrum of the first time-domain signal with the pre-stored short-term energy spectrum of the system background noise. The first time-domain signal whose difference between the short-term energy spectrum of the first time-domain signal and the short-term energy spectrum of the system background noise exceeds the set energy spectrum difference range is determined as an abnormal signal.

Performing spectral analysis on the abnormal signal to obtain the spectral features of the abnormal signal.

Comparing the spectral features of the abnormal signal with the spectral features in the pre-stored PCCP broken wire database. If the spectral features of the abnormal signal are consistent with the spectral features in the PCCP broken wire database, then it is determined that a suspected broken wire event has occurred in the PCCP pipeline.

Step 104: Performing amplitude and phase demodulation on the second electrical signal to obtain a second time-domain signal.

Step 105: Performing energy spectrum analysis and spectral analysis on the second time-domain signal to complete the screening of the preliminary position of the suspected broken wire event. Determining the final position of the suspected broken wire event and whether the suspected broken wire event is a real broken wire event. Specifically:

Performing coherent fading noise suppression on the second time-domain signal by using the fading noise suppression method to obtain a suppressed time-domain signal.

Performing energy spectrum analysis on the suppressed time-domain signal to determine the final location of the suspected broken wire event.

Performing spectral analysis on the time-domain signal at the final position of the suspected broken wire event. If the spectral features of the time-domain signal at the final position of the suspected broken wire event are consistent with the spectral features of the first time-domain signal, then it is determined that the suspected broken wire event is a real broken wire event.

A more specific implementation process of the above monitoring method for broken wires in PCCP based on distributed optical fiber sensing will be described below.

Figure 3:
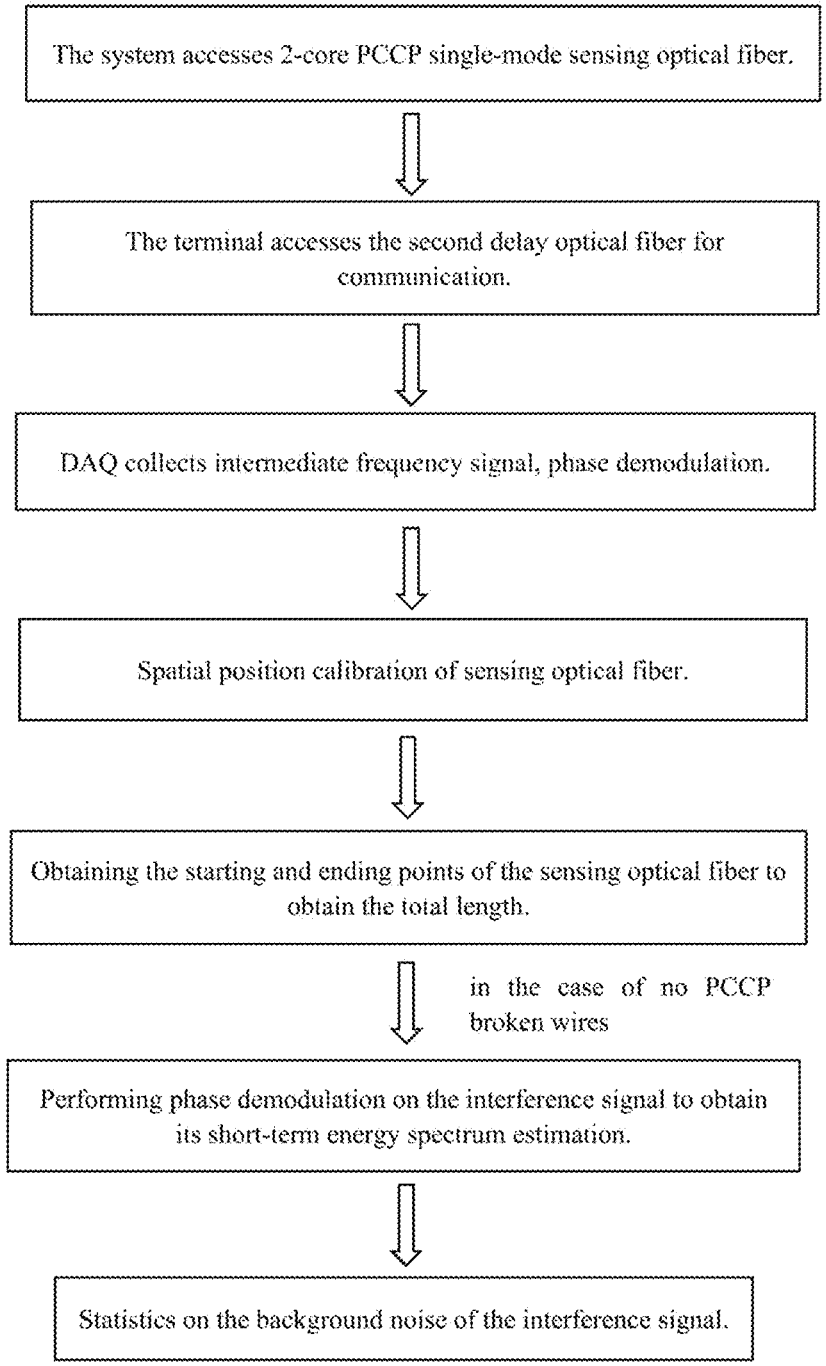
FIG. 3 is a flow chart of the calibration process provided by the embodiments of the invention.

First performing calibration. Referring to FIG. 3, the calibration process is as follow:

1) Connecting the two single-mode sensing optical fibers on the PCCP to the system. The terminals of two single-mode optical fibers are connected through a second delay optical fiber to ensure that the midpoint of the interference path falls on the second delay optical fiber 17. 2) Performing phase demodulation on the intermediate frequency signal collected by the data acquisition card, and calibrating the spatial position of the sensing optical fiber. 3) Obtaining the starting and ending positions of the first sensing optical fiber 16 and the second sensing optical fiber 18, and obtaining the total length of the sensing optical fiber. 4) In the case of no PCCP broken wires, performing phase demodulation on the interference signal collected by the data acquisition card to obtain its short-term energy spectrum estimation, and completing the system's statistics on the background noise of the interference signal.

Figure 4:
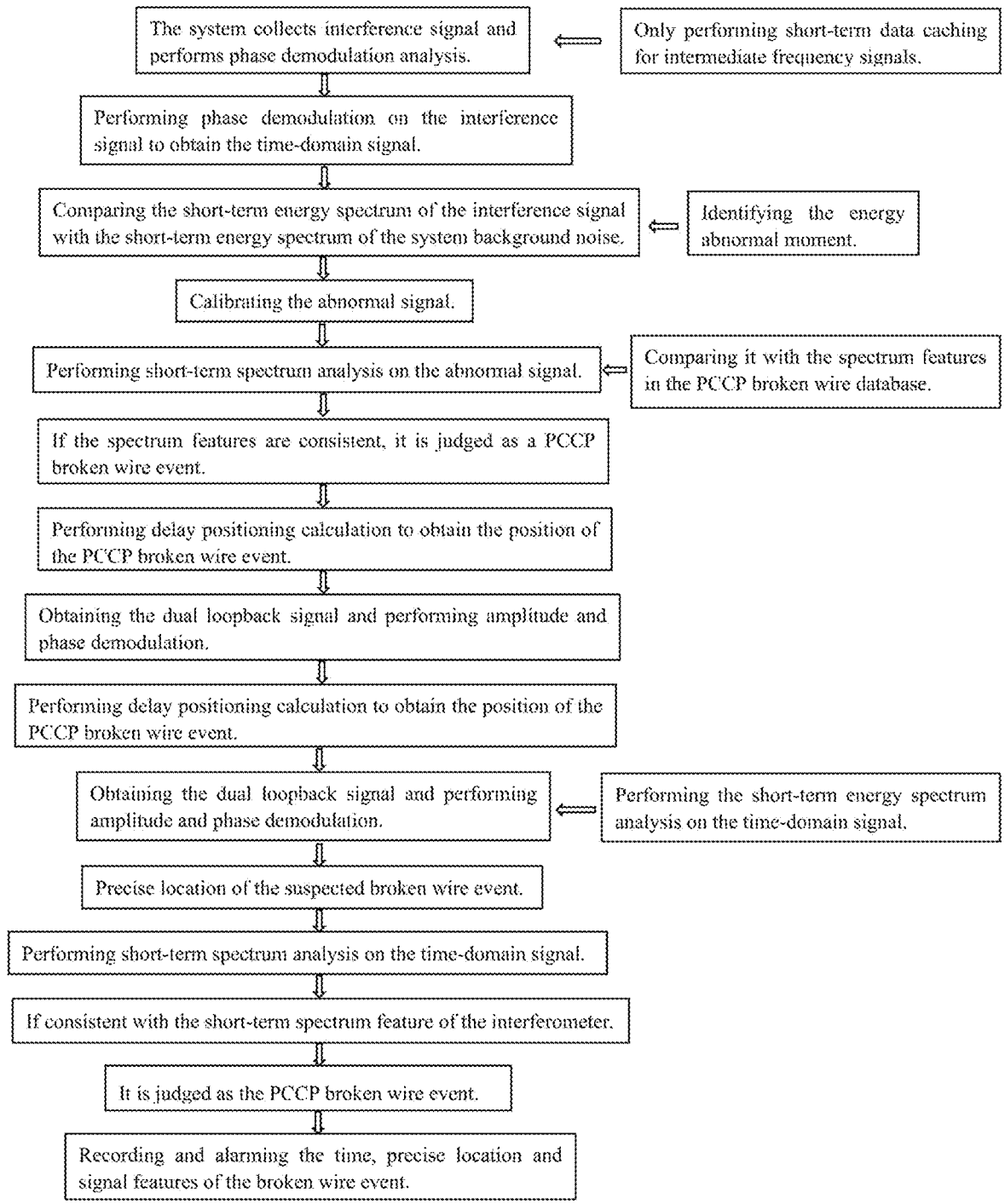
FIG. 4 is a flow chart of the monitoring process provided by the embodiments of the invention.

After the system calibration is completed, the monitoring of PCCP broken wire events can be started. Referring to FIG. 4, the monitoring process is as follow:

1) When broken wires occur in PCCP, the signal frequency of the transient elastic wave is mainly concentrated in the high frequency band of 10 kHz to 20 kHz. Therefore, after completing position calibration and system noise statistics, the system realizes continuous monitoring of the features of PCCP broken wire events through interference signal collection and phase demodulation analysis. The system only performs short-term data caching for intermediate frequency signals without analysis and processing.

Figure 5:
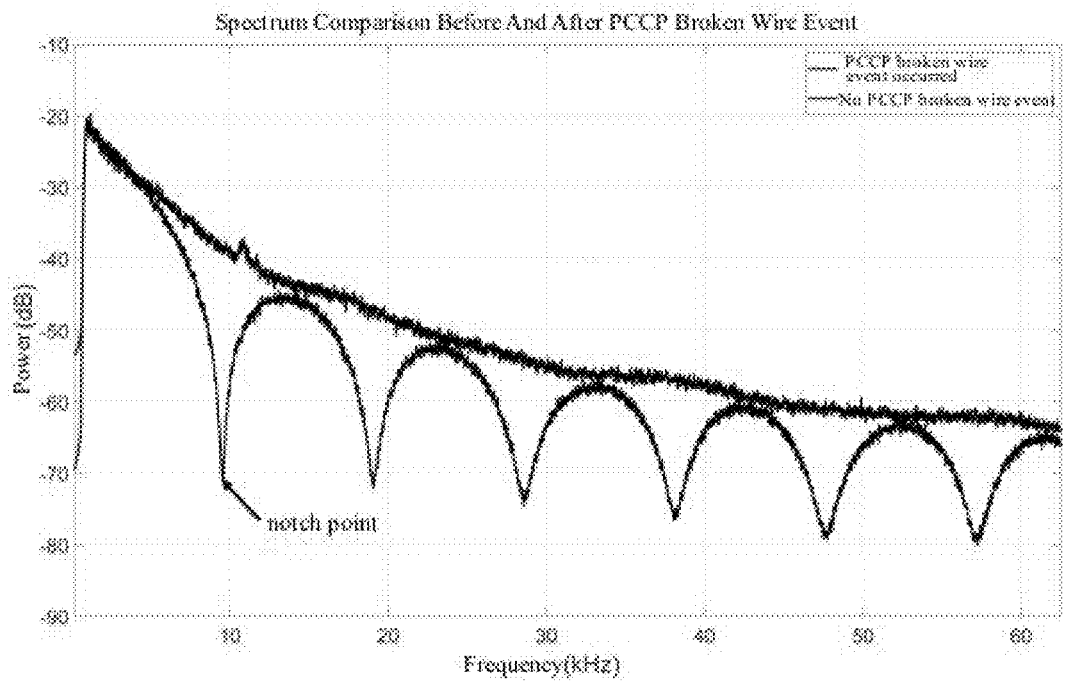
FIG. 5 is a schematic diagram of the spectrum relationship of the PCCP broken wire event provided by the embodiments of the invention.

2) Obtaining the time-domain signal by performing phase demodulation on the interference signal, and comparing its short-term energy spectrum with the short-term energy spectrum of the system background noise, identifying the energy abnormal moment, and calibrating it as an abnormal signal. The comparison effect is shown in FIG. 5.

3) Performing short-term spectrum analysis on the identified abnormal signal, and comparing it with the spectrum features in the PCCP broken wire database. If the spectrum features are consistent, it proves that a PCCP broken wire event occurred at that moment.

4) Obtaining the PCCP broken wire event for delay positioning calculation, and calculating the location of the suspected broken wire event.

Delay Positioning Calculation Method:

The Sagnac interferometer in the system comprises two paths for interference optical signals. The signal light propagating through the two paths passes through the position of the PCCP broken wire event at different times, but the total path length traveled is equal. Therefore, the interference can occur and is detected by the first photodetector. Then the output power of the first photodetector can be expressed as:

$$P(t) = 2AI_0\{1 + \cos[\varphi(t) + \theta]\} \tag{1}$$

In the formula, P(t) is the output power of the first photodetector; A is a constant coefficient related to the optical transmission loss; $I_0$ is the initial light intensity of the two signal lights; φ(t) is the optical phase value generated at a certain moment; θ represents the initial phase of the entire system.

Since the PCCP broken wire event is a broadband disturbance event with multiple vibration frequencies. Therefore, the expression of φ(t) is as follow:

$$\varphi(t) = \varphi_0 \sum_{i}^{n} m_i \sin(w_i t) \quad (2)$$

In the formula, $\varphi_0$ is a constant related to PCCP broken wire strength; $m_i$ is the amplitude of one vibration frequency; $w_i$ is one vibration frequency.

When the interference path is stationary, the phase difference of the two optical signals is 0. When a PCCP broken wire event occurs, φ(t) will change. The position where the broken wire event occurs at the same time is located at the first sensing optical fiber 16 between port 8 and port 9, and at the second sensing optical fiber 18 between port 9 and port 10. Therefore, the following assumptions can be made: ① The propagation time of the optical signal between 8 and 10 is T. ② The propagation time of the optical signal between 3 and 8 is $\tau_2$. ③ The propagation time of the optical signal between the first port 1 and port 10 is $\tau_1$. ④ The event that the optical signal propagates between port 8 and the PCCP wire break event is $t_1$. ⑤ The event that the optical signal propagates between port 10 and the PCCP wire break event is $t_1$.

Since the total length of the sensing optical fiber (first sensing optical fiber 16, second delay optical fiber 17 and second sensing optical fiber 18) is known, the time T is a known quantity. Its expression is as follow:

$$T = \frac{nL}{c} \quad (3)$$

Wherein, n is the refractive index of the optical fiber; L is the length of the sensing optical fiber; c is the speed of light.

The length of the optical fiber between the third port 3-port 8 and the first port 1-port 10 is constant. $\tau_1$ and $\tau_2$ are constant. And because of the introduction of the first delay optical fiber 7 for adjustment, $\tau_1 \neq \tau_2$. Because of the introduction of the second delay optical fiber 17, $2t_1 < T$. The expression of $t_1$ is as follow:

$$t_1 = \frac{nl}{c} \quad (4)$$

l is the distance between the PCCP broken wire event and the starting end of the sensing optical fiber 1.

Since the two optical signals have undergone two phase modulations, A path is at the two moments of $t+\tau_1+t_1$ and $t+\tau_1+T-t_1$, and B path is at the two moments of $t+\tau_2+t_1$ and $t+\tau_2+T-t_1$, then:

$$\Delta\varphi(t) = \varphi_0 \sum_{i}^{n} m_i \left\{ \begin{array}{l} \sin[w_i(t+\tau_1+t_1)] + \sin[w_i(t+\tau_1+T-t_1)] \\ -\sin[w_i(t+\tau_2+t_1)] + \sin[w_i(t+\tau_2+T-t_1)] \end{array} \right\} \quad (5)$$

Δφ(t) represents the amount of phase change, then it can be simplified to get the following:

$$\Delta\varphi(t) = \quad (6)$$
$$4\varphi_0 \sum_{i}^{n} m_i \left\{ \sin[w_i(2t+\tau_1+\tau_2+T)] \cos\left(w_i \frac{\tau_2-\tau_1}{2}\right) \cos\left(w_i \frac{2t_1-T}{2}\right) \right\}$$

It can be seen from formula 4 that when $$\cos\left(w_i \frac{\tau_2-\tau_1}{2}\right) \cos\left(w_i \frac{2t_1-T}{2}\right) = 0$$

appears, Δφ(t) will always be 0. In the frequency domain, it will appear that the intensity of the corresponding $\omega_i$ disturbance frequency will be significantly smaller than the intensity corresponding to the surrounding frequency, resulting in the appearance of a "notch point". The notch frequency is the frequency of the PCCP broken wire event.

Because $\tau_1 \neq \tau_2$, therefore, only when $$\cos\left(w_i \frac{2t_1-T}{2}\right) = 0$$

will a "notch point" be generated, namely:

$$w_i \frac{2t_1-T}{2} = k\pi - \frac{\pi}{2} (k \text{ is an integer}) \quad (7)$$

Then a series of feature frequencies can be obtained:

$$f(i,k) = \frac{w_i}{2\pi} = \left| \frac{2k-1}{2(2t_1-T)} \right| \quad (8)$$

Substituting formula (3) and formula (4), the solution:

$$f(i,k) = \frac{w_i}{2\pi} = \left| \frac{c(2k-1)}{2n(2l-L)} \right| \quad (9)$$

Therefore, the computer only needs to perform short-time Fourier transform on the time-domain waveform signal of the demodulated interference signal to obtain the short-time frequency-domain spectrum. Then, the feature frequency of the PCCP broken wire event can be found, so as to realize the suspected location of the PCCP broken wire.

5) Obtaining the dual loopback signal captured by the coherent detection type Φ-OTDR system corresponding to the position of the suspected broken wire event at this moment, and performing amplitude and phase demodulation.

Figure 6:
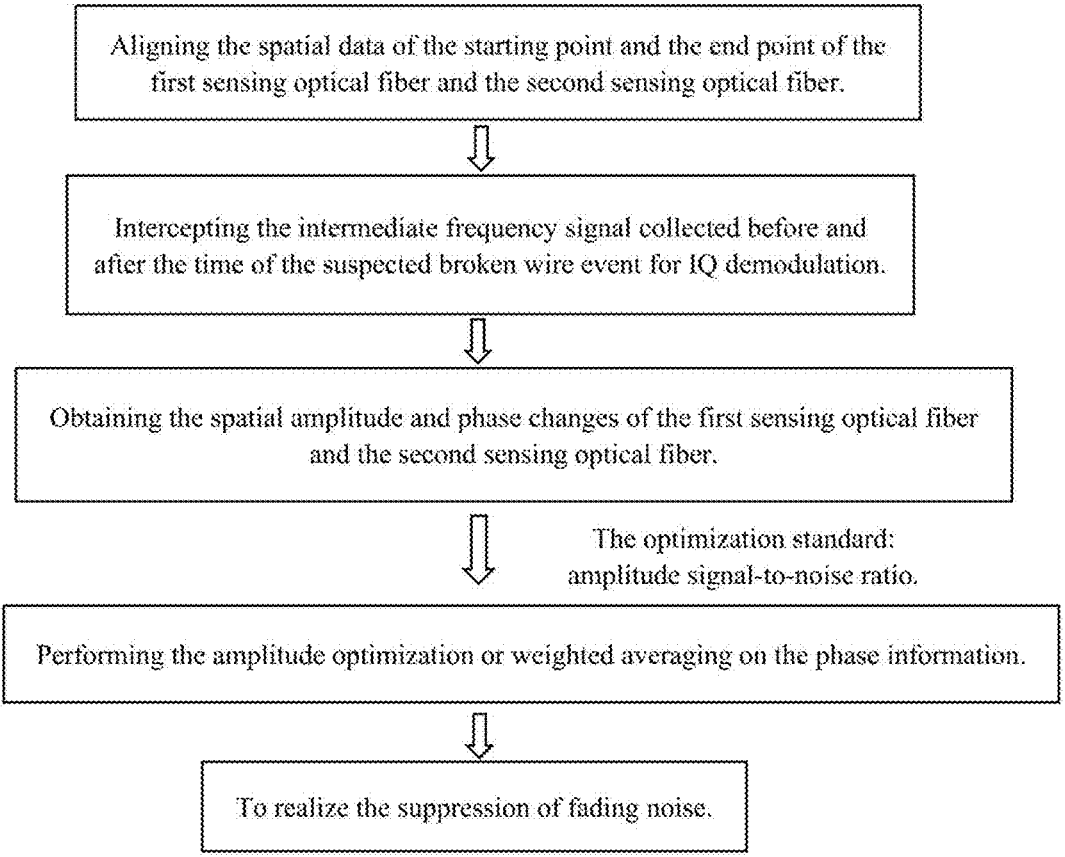
FIG. 6 is a flowchart of a dual loopback fading noise suppression method provided by the embodiments of the invention.
Figure 7:
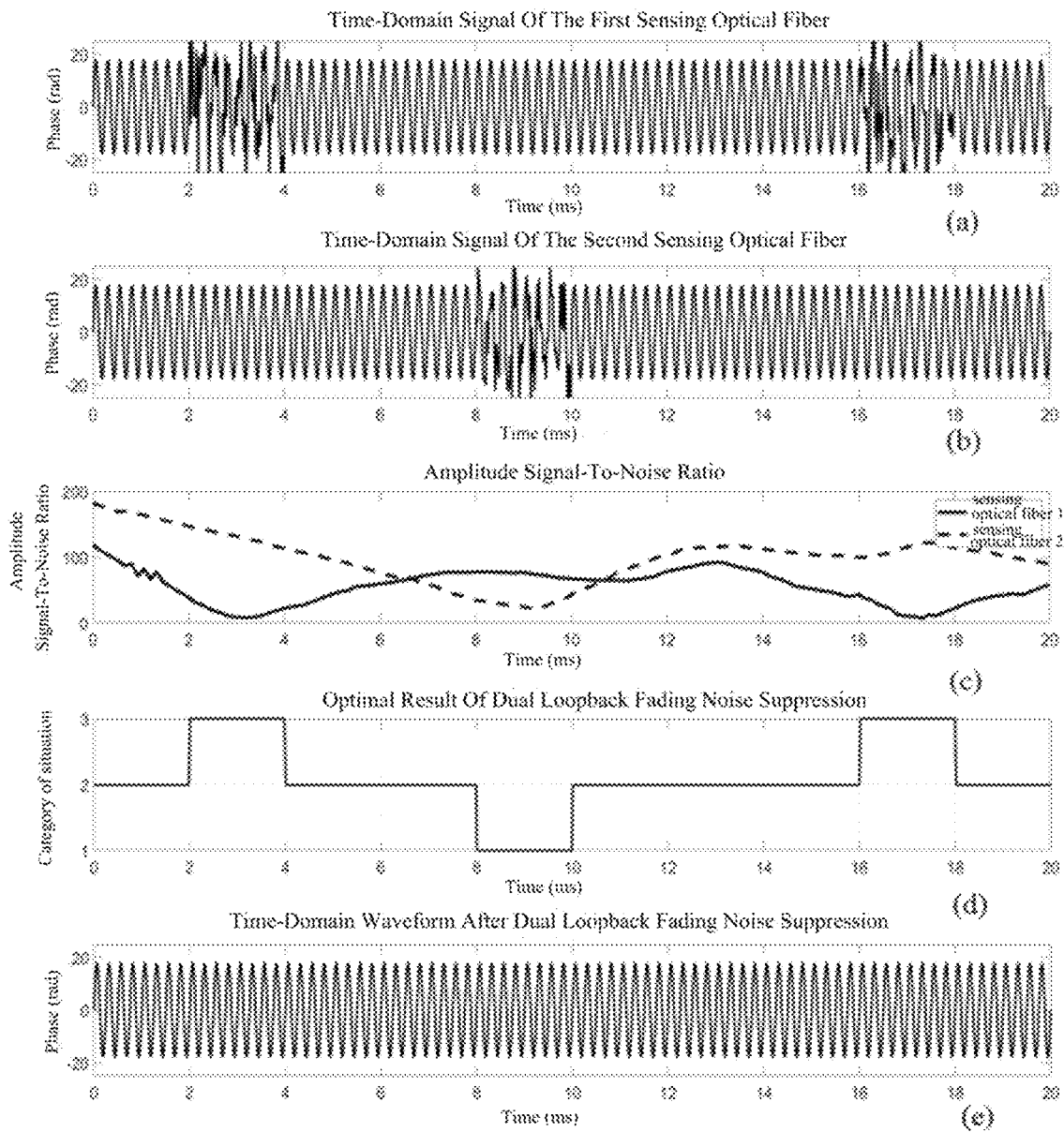
FIG. 7 is a dual loopback fading noise suppression effect diagram provided by the embodiments of the invention.

6) The coherent fading noise (fading) is suppressed by the dual loopback fading noise suppression method. The comparison of its implementation method and implementation effect is shown in FIG. 6 and FIG. 7. Wherein, part (a) of FIG. 7 shows the time-domain signal of the first sensing optical fiber. Part (b) of FIG. 7 shows the time-domain signal of the second sensing optical fiber. Part (c) of FIG. 7 shows amplitude signal-to-noise ratio. Part (d) of FIG. 7 shows the optimal result of dual loopback fading noise suppression. Part (e) of FIG. 7 shows the time-domain waveform after dual loopback fading noise suppression. After the coherent fading noise suppression is completed, performing the short-term energy spectrum analysis on the demodulated time-domain signal to obtain the precise location of the suspected broken wire event.

The dual loopback fading noise suppression method is as follow:

① Taking the spatial position relationship of the first sensing optical fiber 16 as a standard, the spatial data of the second sensing optical fiber 18 is folded so that the starting point and the end point of the first sensing optical fiber 16 and the second sensing optical fiber 18 are spatially aligned.

② Intercepting the intermediate frequency signal collected by the coherent detection type Φ-OTDR system with a certain width before and after the suspected broken wire event for IQ demodulation to obtain the amplitude and phase change information of the first sensing optical fiber 16 and the second sensing optical fiber 18 within this spatial range.

③ Taking the amplitude signal-to-noise ratio as the optimization standard, performing the amplitude optimization or weighted averaging on the demodulated phase information, so as to realize the suppression of fading noise.

7) Performing short-term spectrum analysis on the time-domain signal at the precise location of the suspected broken wire event, and comparing it with the short-term spectrum features of the interferometer. If the common spectrum features are consistent, it is determined that the PCCP broken wire event occurred at this location.

8) Recording and alarming the time, precise location and signal features of the broken wire event.

All the above-mentioned embodiments have the following advantages:

(1) The first laser in the Sagnac interferometer uses wide-spectrum low-coherence continuous light. The second laser in the Φ-OTDR system uses narrow-linewidth high-coherence light. Their optical signals are multiplexed into the same optical fiber through the wavelength division multiplexer to increase transmission capacity and reduce insertion loss.

(2) The Faraday rotating mirror 11 structure can eliminate circular birefringence and linear birefringence in the Sagnac interferometer to avoid the effects of polarization fading noise.

(3) By adjusting the length of the first delay optical fiber 7, the Sagnac interferometer senses the PCCP broken wire event in an asymmetric form. It avoids the situation that two interference signals being modulated by the phase of the same PCCP broken wire event at the same time, and thus causing no phase difference. And the signals cancel each other out, resulting in no interference signal output.

(4) The sensing optical fiber adopts the dual loopback structure. The first sensing optical fiber 16 and the second sensing optical fiber 18 have the same length and are laid on the same line. The same PCCP broken wire event will be detected at two symmetrical positions of the sensing optical fiber to form complementary signals. For the Sagnac interferometer, the signal intensity of the PCCP broken wire event will be enhanced, and the detection capability of the system will be improved. For the coherent detection type Φ-OTDR, two sets of independent detection signals can be obtained at the same PCCP position, which provides a data source for the suppression of coherent fading noise.

(5) By adjusting the length of the second delay optical fiber 17, the midpoint of the interference path of the Sagnac interferometer falls on the second delay optical fiber 17 instead of the first sensing optical fiber 16 or the second sensing optical fiber 18, so as to avoid the detection and location failure of the PCCP broken wire event.

(6) Through integrating Sagnac interferometry and Φ-OTDR technology, the PCCP broken wire event can be qualitatively analyzed and the position of the suspected broken wire event can be given through the Sagnac interferometer. The position of the suspected broken wire event can be accurately positioned by Φ-OTDR technology. This strategy can greatly reduce the computing pressure of the computer (PC), and at the same time ensure the identification accuracy and high positioning accuracy of PCCP broken wire event.

(7) For the coherent detection type Φ-OTDR system, by optimizing the dual loopback signal, coherent fading noise (fading) can be suppressed, thus improving the signal-to-noise ratio and positioning accuracy of the system.

It can be seen that the invention combines wavelength division multiplexer technology, Faraday rotating mirror 11, increased delay optical fiber structure and dual loopback structure to realize fast capture and recognition of transient broadband signals. It has the advantages of high recognition accuracy, precise positioning, and low false alarm rate, etc.

Each embodiment in this specification is described in a progressive manner. Each embodiment focuses on the difference from other embodiments. The same and similar parts of each embodiment can be referred to each other. As for the method disclosed in the embodiments, since it corresponds to the system disclosed in the embodiments, the description is relatively simple. For the relevant parts, please refer to the description of the system.

In the invention, specific examples have been used to illustrate the principle and embodiments of the invention. The description of the above embodiments is only used to help understand the method of the invention and its core idea. Meanwhile, for those of ordinary skill in the art, according to the idea of the invention, there will be changes in the specific embodiments and application range. In summary, the content of this specification should not be understood as the limitation of the invention.

The invention claimed is:

1. A monitoring system for broken wires in Pre-stressed Concrete Cylinder Pipe (PCCP), based on distributed optical fiber sensing, the monitoring system configured for detecting broken wires in PCCP pipelines, the PCCP pipeline comprises a pipeline body and an optical cable laid on the pipeline body, the optical cable at least comprises a first sensing optical fiber and a second sensing optical fiber;

the monitoring system for broken wires in PCCP comprises a Sagnac interferometer, a Φ-OTDR system, a dual loopback system and a signal processing system;

the Sagnac interferometer comprises a first laser, a first optical coupler, a first delay optical fiber, a Faraday rotating mirror and a first photodetector, the Φ-OTDR system comprises a second laser, a second optical coupler, an acousto-optic modulator, a circulator, a third optical coupler and a second photodetector, the dual loopback system comprises a wavelength division multiplexer and a second delay optical fiber;

the first laser is used to output the first laser light, the first port of the first optical coupler is used to receive the first laser light, the fourth port of the first optical coupler is used to transmit the first laser light to the first delay optical fiber, the first delay optical fiber is used to delay the first laser light to obtain the first delay light, the faraday rotating mirror is used to rotate the polarization state of the first delay light to obtain a first state transition light, and return the first state transition light to the first delay optical fiber, the first delay optical fiber is also used to delay the first state transition light and return the obtained second delay light to the first optical coupler, the sixth port of the first optical coupler is used to transmit the first laser light to the wavelength division multiplexer;

the second laser is used to output a second laser light, the spectral width of the first laser light is greater than the spectral width of the second laser light, the correlation of the first laser light is smaller than the correlation of the second laser light, the second optical coupler is used to divide the second laser light into two paths, one path is the probe light and the other path is the reference light, the acousto-optic modulator is used to modulate the probe light into pulsed light with a set frequency shift amount, the first port of the circulator is used to receive the pulsed light, the second port of the circulator is used to transmit the pulsed light to the wavelength division multiplexer;

one end of the wavelength division multiplexer is connected to one end of the first sensing optical fiber, the other end of the first sensing optical fiber is connected to one end of the second delay optical fiber, the other end of the second delay optical fiber is connected to one end of the second sensing optical fiber, the other end of the second sensing optical fiber is connected to the fifth port of the first optical coupler, the wavelength division multiplexer is used to transmit the first laser light to the first sensing optical fiber, the first laser light is sequentially transmitted through the first sensing optical fiber, the second delay optical fiber and the second sensing optical fiber to generate a third delay light, the fifth port of the first optical coupler is used to receive the third delay light, the wavelength division multiplexer is also used to transmit the pulsed light to the first sensing optical fiber, the pulsed light sequentially passes through the first sensing optical fiber, the second delay optical fiber and the second sensing optical fiber and generates Rayleigh backscattering light during transmission, after the Rayleigh backscattering light passes through the wavelength division multiplexer and the second port of the circulator in sequence, it enters the third optical coupler from the third port of the circulator;

the fifth port of the first optical coupler is also used to transmit the second delay light to the second sensing optical fiber, after the second delay light is sequentially transmitted through the second sensing optical fiber, the second delay optical fiber and the first sensing optical fiber, the first interference optical signal is generated, the sixth port of the first optical coupler is also used to receive the first interference optical signal;

the fourth port of the first optical coupler is also used to transmit the third delay light to the first delay optical fiber, the first delay optical fiber is also used to delay the third delay light to obtain the fourth delay light, the Faraday rotating mirror is used to rotate the polarization state of the fourth delay light to obtain a second state transition light, and return the second state transition light to the first delay optical fiber, the first delay optical fiber is also used to delay the second state transition light to obtain a second interference optical signal, the fourth port of the first optical coupler is also used to receive the second interference optical signal, the first interference optical signal and the second interference optical signal interfere with each other at the third port of the first optical coupler to form the interference signal;

the first photodetector is connected to the third port of the first optical coupler for receiving the interference signal, and performing photoelectric conversion on the interference signal to obtain a first electrical signal;

the third optical coupler is used to couple the pulsed light and the Rayleigh backscattering light to form the frequency signal, the second photodetector is connected to the third optical coupler for receiving the frequency signal, and performing photoelectric conversion on the frequency signal to obtain a second electrical signal;

the signal processing system is respectively connected to the first photodetector and the second photodetector;

the signal processing system is used for:

performing phase demodulation on the first electrical signal to obtain a first time-domain signal;

performing energy spectrum analysis and spectral analysis on the first time-domain signal to determine whether a suspected broken wire event occurs in the PCCP pipeline, and performing delay positioning calculations according to the first time-domain signal to determine the initial location of a suspected broken wire event when a suspected broken wire event occurs;

performing amplitude and phase demodulation on the second electrical signal to obtain a second time-domain signal;

performing energy spectrum analysis and spectral analysis on the second time-domain signal to complete the screening of the initial location of the suspected broken wire event, and determine the final position of the suspected broken wire event and whether the suspected broken wire event is a real broken wire event.

2. The monitoring system for broken wires in PCCP based on distributed optical fiber sensing of claim 1, the Sagnac interferometer also comprises a first optical filter and a second optical filter;

the first optical filter is arranged between the sixth port of the first optical coupler and the wavelength division multiplexer, the second optical filter is arranged between the second sensing optical fiber and the fifth port of the first optical coupler.

3. The monitoring system for broken wires in PCCP based on distributed optical fiber sensing of claim 1, the Φ-OTDR system comprises an erbium doped fiber amplifier;

the erbium doped fiber amplifier is arranged between the acousto-optic modulator and the circulator.

4. The monitoring system for broken wires in PCCP based on distributed optical fiber sensing of claim 1, the Sagnac interferometer also comprises an optical isolator;

the optical isolator is arranged between the first laser and the first port of the first optical coupler.

5. The monitoring system for broken wires in PCCP based on distributed optical fiber sensing of claim 1, the signal processing system specifically comprises a data acquisition card and a computer;

the data acquisition card is respectively connected with the first photodetector, the second photodetector and the computer;

the data acquisition card is used to collect the first electrical signal and the second electrical signal;

the computer comprises:

a first demodulation module is used to perform phase demodulation on the first electrical signal to obtain a first time-domain signal;

the preliminary analysis module of the broken wire location is used to perform energy spectrum analysis and spectral analysis on the first time-domain signal to determine whether a suspected broken wire event occurs in the PCCP pipeline, and perform delay positioning calculations according to the first time-domain signal to determine the initial location of a suspected broken wire event when a suspected broken wire event occurs;

a second demodulation module is used to perform amplitude and phase demodulation on the second electrical signal to obtain a second time-domain signal;

the final analysis module of the broken wire location is used to perform energy spectrum analysis and spectral analysis on the second time-domain signal to complete the screening of the initial location of the suspected broken wire event, and determine the final position of the suspected broken wire event and whether the suspected broken wire event is a real broken wire event.

6. The monitoring system for broken wires in PCCP based on distributed optical fiber sensing of claim 5, the signal processing system also comprises an acousto-optic modulation driver;

the acousto-optic modulation driver is respectively connected with the data acquisition card and the acousto-optic modulator, the data acquisition card is also used to receive the clock carrier signal and the pulse trigger modulation signal sent by the computer, the acousto-optic modulation driver is used to output a high-level pulse modulation signal to the acousto-optic modulator according to the clock carrier signal and the pulse trigger modulation signal.

7. The monitoring system for broken wires in PCCP based on distributed optical fiber sensing of claim 5, the signal processing system also comprises an electrical filter;

the electrical filter is arranged between the second photodetector and the data acquisition card.

8. A monitoring method for broken wires in PCCP based on distributed optical fiber sensing, the monitoring method configured for the monitoring system for broken wires in PCCP of claim 7, the method comprises:

acquiring the first electrical signal and the second electrical signal, the first electrical signal is obtained by photoelectrically converting the interference signal, the second electrical signal is obtained by photoelectrically converting the frequency signal, the interference signal is formed by the mutual interference of the first interference optical signal and the second interference optical signal, the first interference optical signal is formed by the first laser light passing through the fourth port of the first optical coupler, the first delay optical fiber, the Faraday rotating mirror, the first delay optical fiber, the fourth port of the first optical coupler, the fifth port of the first optical coupler, the second sensing optical fiber, the second delay optical fiber, the first sensing optical fiber, the wavelength division multiplexer and the sixth port of the first optical coupler, the first interference optical signal is formed by the first laser light passing through the sixth port of the first optical coupler, the wavelength division multiplexer, the first sensing optical fiber, the second delay optical fiber, the second sensing optical fiber, the fifth port of the first optical coupler, the fourth port of the first optical coupler, the first delay optical fiber, the Faraday rotating mirror, the first delay optical fiber and the fourth port of the first optical coupler, the frequency signal is obtained by coupling pulsed light and Rayleigh backscattering light in the second laser light, the Rayleigh backscattering light is the backward generated in the transmission process when the probe light in the second laser light successively passes through the acousto-optic modulator, the circulator, the wavelength division multiplexer, the first sensing optical fiber, the second delay optical fiber and the second sensing optical fiber;

performing phase demodulation on the first electrical signal to obtain a first time-domain signal;

performing energy spectrum analysis and spectral analysis on the first time-domain signal to determine whether a suspected broken wire event occurs in the PCCP pipeline, and performing delay positioning calculations according to the first time-domain signal to determine the initial location of a suspected broken wire event when a suspected broken wire event occurs;

performing amplitude and phase demodulation on the second electrical signal to obtain a second time-domain signal;

performing energy spectrum analysis and spectral analysis on the second time-domain signal to complete the screening of the initial location of the suspected broken wire event, and determine the final position of the suspected broken wire event and whether the suspected broken wire event is a real broken wire event.

9. The monitoring method for broken wires in PCCP based on distributed optical fiber sensing of claim 8, performing energy spectrum analysis and spectral analysis on the first time-domain signal to determine whether a suspected broken wire event occurs in the PCCP pipeline, which specifically comprises:

performing energy spectrum analysis on the first time-domain signal to determine the short-term energy spectrum of the first time-domain signal;

comparing the short-term energy spectrum of the first time-domain signal with the pre-stored short-term energy spectrum of the system background noise, the first time-domain signal whose difference between the short-term energy spectrum of the first time-domain signal and the short-term energy spectrum of the system background noise exceeds the set energy spectrum difference range is determined as an abnormal signal;

performing spectral analysis on the abnormal signal to obtain the spectral features of the abnormal signal;

comparing the spectral features of the abnormal signal with the spectral features in the pre-stored PCCP broken wire database, if the spectral features of the abnormal signal are consistent with the spectral features in the PCCP broken wire database, then it is determined that a suspected broken wire event has occurred in the PCCP pipeline.

10. The monitoring method for broken wires in PCCP based on distributed optical fiber sensing of claim 8, performing energy spectrum analysis and spectral analysis on the second time-domain signal to complete the screening of the the initial location of the suspected broken wire event, and determine the final position of the suspected broken wire event and whether the suspected broken wire event is a real broken wire event, which specifically comprises:

performing coherent fading noise suppression on the second time-domain signal by using the fading noise suppression method to obtain a suppressed time-domain signal;

performing energy spectrum analysis on the suppressed time-domain signal to determine the final location of the suspected broken wire event;

performing spectral analysis on the time-domain signal at the final position of the suspected broken wire event, if the spectral features of the time-domain signal at the final position of the suspected broken wire event are consistent with the spectral features of the first time-domain signal, then it is determined that the suspected broken wire event is a real broken wire event.

\* \* \* \* \*